July 25, 1961 H. L. ARNOLD 2,993,701
CHUCK OPENING AND CLOSING MECHANISM
Filed June 2, 1958 2 Sheets-Sheet 1

INVENTOR.
HAROLD L. ARNOLD
BY
Lindsey and Pritzman
ATTORNEYS

July 25, 1961 H. L. ARNOLD 2,993,701
CHUCK OPENING AND CLOSING MECHANISM
Filed June 2, 1958 2 Sheets-Sheet 2
FIG. 3
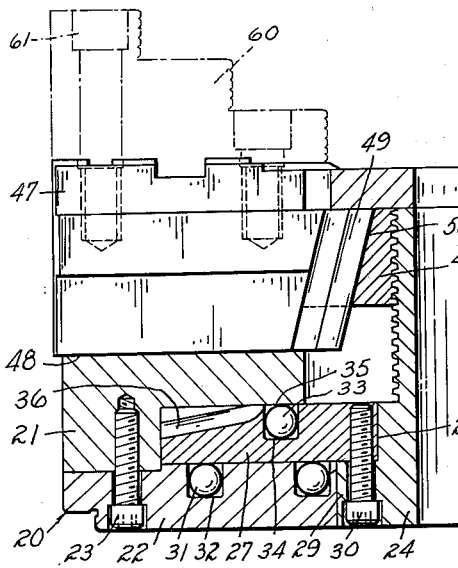
FIG. 4
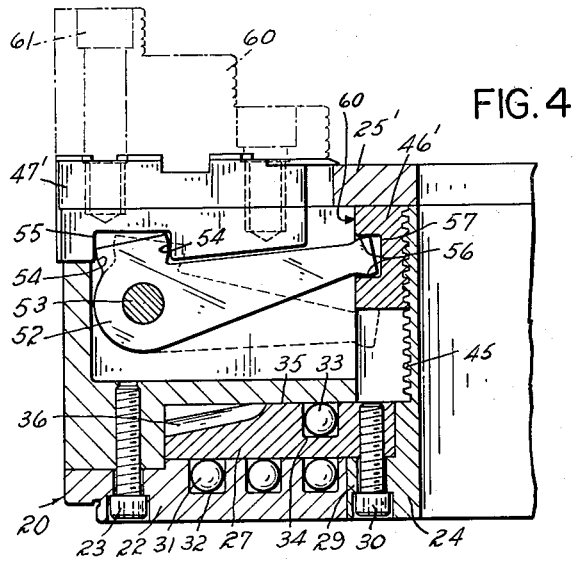
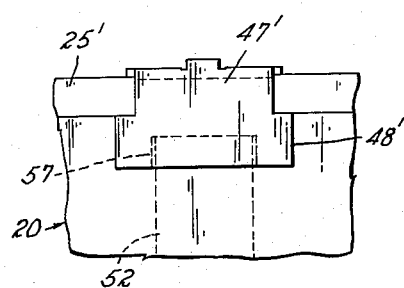
FIG. 5
INVENTOR.
HAROLD L. ARNOLD
BY
Lindsey and Pritzman
ATTORNEYS

United States Patent Office 2,993,701
Patented July 25, 1961

1

2,993,701
CHUCK OPENING AND CLOSING MECHANISM
Harold L. Arnold, Hartford, Conn., assignor to The Skinner Chuck Company, New Britain, Conn., a corporation of Connecticut
Filed June 2, 1958, Ser. No. 739,035
4 Claims. (Cl. 279—114)

This invention relates to chucks, and more particularly to improvements in precision chucks.

An object of the invention is to provide an improved mechanism for opening and closing the jaws of a chuck with extreme accuracy while applying substantial forces thereto.

A more specific object is to provide a simple but rugged jaw operating mechanism for chucks of the type having radially movable jaws, which is economical to fabricate and assemble, which will provide a long trouble-free service life, which will provide an optimum degree of mechanical advantage, and which will provide very close concentric tolerances during heavy duty work conditions.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the drawings:

FIG. 3 is a diametric section along line 3—3, FIG. 1.

FIG. 4 is a fragmentary section substantially along line 3—3 of FIG. 1 but showing a modification of the jaw actuating mechanism; and FIG. 5 is a fragmentary side view of the modified jaw of FIG. 4.

Figure 1:
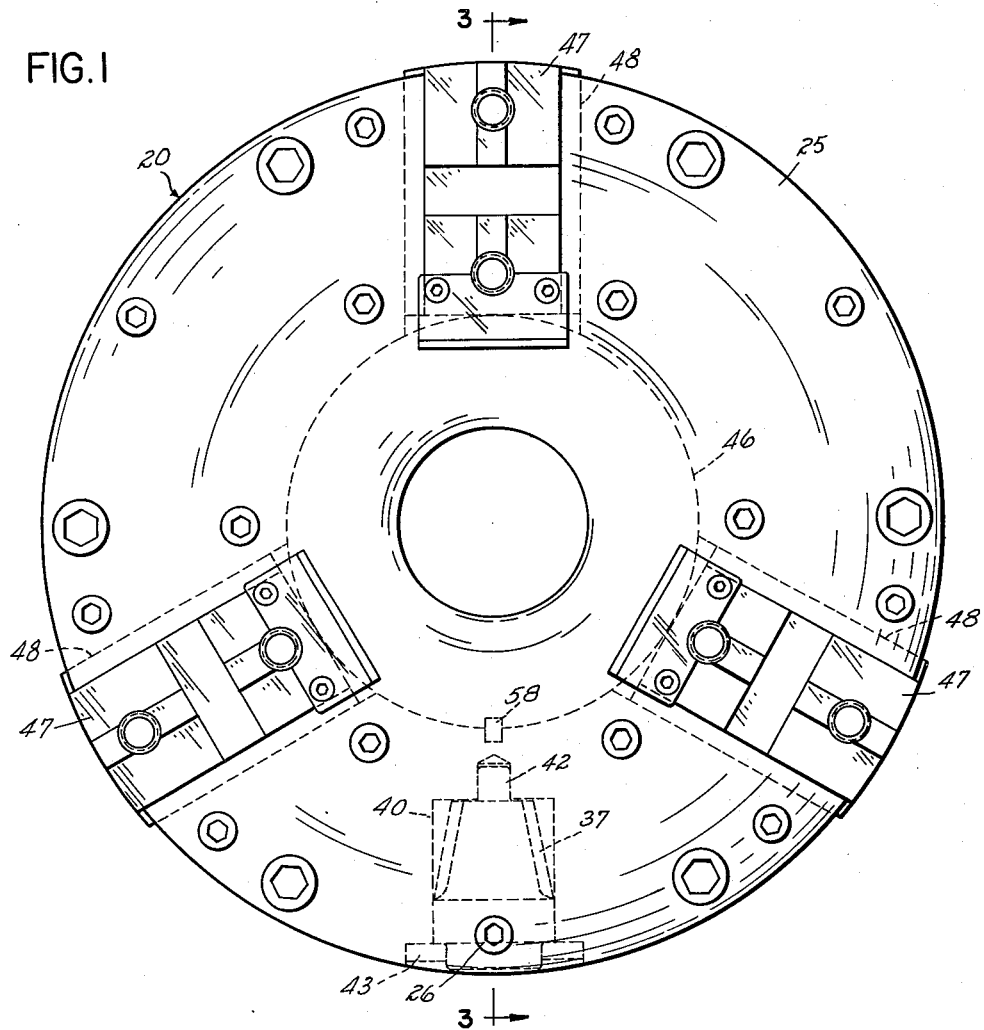
FIG. 1 shows in front elevation a chuck having the invention incorporated therein.
Figure 2:
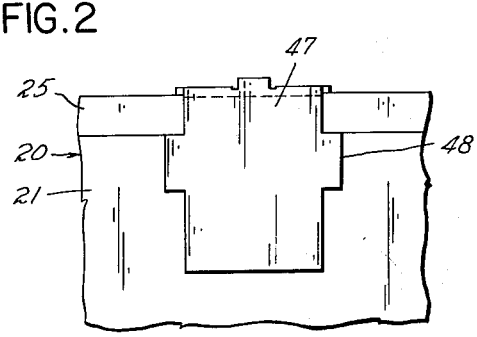
FIG. 2 is a fragmentary side view of one of the jaws of the chuck shown in FIG. 1.

FIGS. 1, 2, and 3 show a chuck 20, the major components of which include an annular chambered body 21 providing mounting support for an annular backing plate 22 and an annular face plate 25 clamped to the body by cap screws such as 23 and 26, respectively. A hub-like center sleeve 24 is rotatably mounted in respect to the body and plates by a ring gear 27, clamped radially to sleeve 24 by bolts 30, extending through a sleeve flange 29. Gear 27 is journalled between surface 35 of body 21 and to the top surface of plate 22 by balls 31 disposed in race grooves 32 of plate 22 and by balls 33 in race grooves 34 of gear 27.

Ring gear 27 is rotated for jaw adjustment, as later described, by pinion gear 37, radially disposed in a body chamber 40 in mesh with gear 27. Pinion 37 has a forward shank portion 42 disposed in a complemental body bore and an aft bearing annulus 43 embracing suitably shouldered portions of the gear and clamped to the body by screws 44 to constrain gear 37 against axial movement. A wrench socket 41 provides for manual or power wrench rotation of pinion 37 to rotate ring gear 27 in either direction with corresponding rotation of sleeve 24 which is externally threaded at 45 to control the jaw actuating mechanism as hereafter described.

Sleeve 24 is rotatable but constrained against axial movement in either axial direction by the gear 27 to which sleeve 24 is fixed. By way of illustration, gear 27 has been shown as having a ball bearing mounting although it will be understood that other suitable types of thrust bearings may be used. The sleeve 24 is threaded as indicated at 45 and carries a complementally threaded traveling nut-like jaw actuator 46 which has its

2 internal threads in mesh with the sleeve threads 45. Actuator 46 is keyed at 58 to body 21 to prevent rotation of the actuator 46 but permitting it to move axially in response to rotation of sleeve 24 in either direction, the actuator being shown in FIG. 3 in the forward position but being movable rearwardly within the annular chamber 59 defined by the chuck body, the ring gear, and the sleeve. The actuator 46 is fitted very closely at its outer diameter to the wall 60 of chamber 59 so that wall 60 guides actuator 46 throughout its range of movement so as to provide accurate positioning of the actuator concentrically of the chuck.

As shown in FIG. 1, the chuck has mounted thereon three equi-angularly spaced master jaws 47 slidable in radially disposed guideways 48 defined by body channels and the face plate as shown in FIG. 2. Each master jaw is formed at its inner end with a bearing portion or tongue 49, T shaped in horizontal cross section, and inclined in respect to the axis of the chuck as shown in FIG. 3. The T shaped bearing portions are slidably disposed in complemental T shaped guideways 50 formed in jaw actuator 46 having the same angle of inclination. Hence, as seen in FIG. 3, when actuator 46 moves axially, it cams the jaws 47 radially inwardly or outwardly depending upon the direction of movement of the actuator 46. The master jaws 47 have mounted thereon, by screws 61, the usual work engaging jaws 60.

Actuator 46 is of rugged construction as are the T shaped inclined bearings 49 of jaws 47 engaged therewith and hence can transmit forces of great magnitude. Sleeve 24 and actuator 46 are preferably provided with threads 45 of either the acme or square types which are well understood to be capable of transmitting very heavy power loads. As previously mentioned, the actuator 4 is closely fitted to the wall of chamber 59 and the bearing portions 49, the bearing guideways 50, the jaw guideways 48 and the guides of master jaws 47 are machined to very close tolerances. Hence, the jaws are held concentrically positioned within very close tolerances throughout their range of adjustment regardless of the magnitude of applied forces.

Opening and closing forces of exceedingly high magnitude can be applied to the jaws by means of a wrench inserted into the socket 41, as it will be realized that not only is there a great mechanical advantage resulting from the difference in diameters of sleeve 24 and the ring gear 27 as well as the wedging action provided by the T connection 49, 50, but, in addition, the lead or pitch of the thread 45 of the sleeve may be selected over a wide range to give the precise operating characteristics desired.

In the modification of FIG. 4, actuator 46' is shown coupled to jaw 47' in an alternate manner, the chuck assembly shown being otherwise substantially the same as that above described and incorporating the same operating principles. In this modification, the T connections between the jaws and actuator are omitted and instead, the body 21 is chambered to receive a plurality of bell-cranks 52, one for each jaw 47 and each pivotable about a bearing 53 and having arms of unequal length including a short arm terminating in spaced bearing surfaces 54 and a long arm terminating in spaced bearing surfaces 56. Jaws 47' are channeled at 55 and jaw actuator 46' is channeled at 57 to define, respectively, snug cam follower surfaces complemental to the cam surfaces 54 and 56 of the short and long bell-crank arms respectively. As is evident, axial movement of actuator 46' in a rearward direction will pivot bell-crank 52 clockwise with a resultant camming action between the right hand short arm surface 54 thereof and the corresponding follower surface to move the jaw from the heavy to the dotted line position shown. Reverse movement of actuator 46' shifts the cam load to the opposite spaced cam and follower surfaces to move the bell-crank to the heavy line position with the jaws moved radially outwardly. As in the first modification, extreme accuracy and the application of opening and closing forces of high order are provided by the use of the sleeve 24 and actuator 46.

As will be apparent to persons skilled in the art, various modifications and adaptations of the structure shown and described herein will become readily apparent to persons skilled in the art without departure from the inventive concepts, the scope of which are defined in the appended claims.

I claim:

1. A chuck comprising a chuck body, a plurality of jaws radially movable on the chuck body, and an operating mechanism for the jaws comprising an exteriorly threaded cylindrical member extending axially of the chuck body, a non-rotatable but axially movable internally threaded actuator in mesh with said cylindrical member for axial movement in response to rotation of the cylindrical member, means for rotating the cylindrical member, guide means for said actuator closely fitted to the outer periphery thereof, said guide means being fixedly supported by the chuck body, and means connecting the actuator to the jaws for moving the jaws radially responsive to axial movement of the actuator.

2. A chuck comprising a chuck body, a plurality of jaws radially movable on the chuck body, an exteriorly threaded cylindrical member extending axially of the chuck body, a non-rotatable but axially movable internally threaded actuator mounted on said cylindrical member for axial movement in response to rotation of the cylindrical member, guide means for said actuator closely fitted to the outer periphery thereof, said guide means being fixedly supported by the chuck body, and means coupling the actuator to the jaws including a pivotally mounted bell crank for each of said jaws having one arm engaged with the actuator and another arm engaged with its respective jaw whereby the jaws are moved radially responsive to axial movement of the actuator.

3. A chuck comprising a chuck body having an axially extending opening therein, a plurality of jaws mounted on the body for radial movement, an actuator fitted in said opening for axial but non-rotational movement, guide means for said actuator closely fitted to the outer periphery thereof, said guide means being fixedly supported by the chuck body, means for moving the actuator axially comprising a rotatable shaft threadably engaged with and extending through the actuator, gear means for rotating the shaft, and means connecting the actuator to the jaws for moving the jaws radially responsive to axial movement of the actuator.

4. In a device of the character described, a chuck body provided with a central aperture and a radial channel, a ring gear disposed in said channel, an apertured plate clamped to said body to enclose said gear, ball bearings between the gear and said plate and body, an externally threaded sleeve fixed to the ring gear and disposed in the central aperture of the chuck body, an internally threaded actuator mounted on the sleeve, guide means for preventing rotation of the actuator but permitting guided axial movement thereof, said guide means being closely fitted to the outer periphery of said actuator, a plurality of radially movable jaws supported by the chuck body, driving means between the actuator and the jaws, and a pinion gear rotatably supported by said body in mesh with said ring gear.

References Cited in the file of this patent

UNITED STATES PATENTS

| | | |
|---|---|---|
| 1,548,227 | Van Hammersveld | Aug. 4, 1925 |
| 1,971,537 | Sloan et al. | Aug. 28, 1934 |
| 2,697,612 | Sloan | Dec. 21, 1954 |
| 2,825,572 | Sloan et al. | Mar. 4, 1958 |
| 2,828,134 | Buck et al. | Mar. 25, 1958 |

FOREIGN PATENTS

| | | |
|---|---|---|
| 297,077 | Great Britain | 1929 |
| 859,916 | France | Sept. 20, 1940 |